United States Patent
Reis

(10) Patent No.: US 9,893,799 B2
(45) Date of Patent: Feb. 13, 2018

(54) PERSONAL COMMUNICATIONS DEVICE FOR RELIABLE SATELLITE COMMUNICATIONS

(71) Applicant: Higher Ground LLC, Palo Alto, CA (US)

(72) Inventor: Robert S. Reis, Palo Alto, CA (US)

(73) Assignee: Higher Ground LLC, Palo Alto, CA (US)

( * ) Notice: Subject to any disclaimer, the term of this patent is extended or adjusted under 35 U.S.C. 154(b) by 213 days.

(21) Appl. No.: 14/106,868

(22) Filed: Dec. 16, 2013

(65) Prior Publication Data

US 2016/0374047 A1     Dec. 22, 2016

Related U.S. Application Data

(60) Provisional application No. 61/738,311, filed on Dec. 17, 2012.

(51) Int. Cl.
*H04B 7/185* (2006.01)

(52) U.S. Cl.
CPC .............................. *H04B 7/18517* (2013.01)

(58) Field of Classification Search
CPC ................................................. H04B 7/18517
See application file for complete search history.

(56) References Cited

U.S. PATENT DOCUMENTS

| | | | |
|---|---|---|---|
| 5,535,432 A | 7/1996 | Dent | |
| 5,586,165 A | 12/1996 | Wiedeman | |
| 5,732,359 A | 3/1998 | Baranowsky, II et al. | |
| 5,812,932 A * | 9/1998 | Wiedeman | H04B 7/18539 342/352 |
| 5,898,668 A | 4/1999 | Shaffer | |
| 6,061,579 A | 5/2000 | Arai et al. | |
| 6,157,834 A | 12/2000 | Helm et al. | |
| 6,160,509 A * | 12/2000 | Graziani | G01S 5/0045 342/357.57 |
| 6,272,316 B1 * | 8/2001 | Wiedeman | H04B 7/18539 455/12.1 |
| 6,400,946 B1 | 6/2002 | Vazvan et al. | |
| 6,400,962 B1 | 6/2002 | Yamada | |

(Continued)

OTHER PUBLICATIONS

Handset: Smartphone, Texas Instruments, downloaded from web page: http://www.ti.com/solution/handset_smartphone, Downloaded date: Aug. 15, 2016, original posting date: unknown, 1 page.

(Continued)

*Primary Examiner* — Nathan Mitchell
(74) *Attorney, Agent, or Firm* — Panitch Schwarze Belisario & Nadel LLP

(57) ABSTRACT

A personal communications device for communications using a satellite in a satellite communications system. The personal communications device includes a location algorithm for determining the satellite location and the personal communications device location, a path algorithm for predicting an improved communication path between the satellite and the personal communications device, a position change algorithm for determining a recommended change in position of the personal communications device so as to position the personal communications device in the improved communication path.

19 Claims, 11 Drawing Sheets

(56) References Cited

U.S. PATENT DOCUMENTS

| | | | |
|---|---|---|---|
| 7,471,956 B2* | 12/2008 | Byford | H04W 4/02 455/414.2 |
| 8,120,528 B2* | 2/2012 | Tessier | H04B 7/18554 342/357.48 |
| 2001/0044280 A1* | 11/2001 | Samuels | H03D 7/163 455/77 |
| 2003/0128671 A1 | 7/2003 | Niesen | |
| 2003/0143949 A1 | 7/2003 | Karabinis | |
| 2007/0049192 A1 | 3/2007 | Hoffmann et al. | |
| 2007/0213046 A1 | 9/2007 | Li et al. | |
| 2010/0056181 A1 | 3/2010 | Rippon et al. | |
| 2011/0136428 A1 | 6/2011 | Ritter | |
| 2011/0241827 A1 | 10/2011 | Varoglu | |
| 2012/0127922 A1 | 5/2012 | Feher | |
| 2012/0147040 A1* | 6/2012 | Yun | G06T 19/006 345/633 |
| 2014/0055490 A1* | 2/2014 | Mule | G06T 11/80 345/633 |

OTHER PUBLICATIONS

Office Action dated Dec. 2, 2016 in U.S. Appl. No. 14/022,228, by Reis.

Office Action dated Apr. 7, 2017 in U.S. Appl. No. 14/022,228, by Reis.

Augmented Reality App—the Next Generation Satellite Finder, Dish Pointer, downloaded from web page: http://www.dishpointer.com/2009/augmented-reality-satellite-finder/, Download Date: Oct. 20, 2017, original posting date: unknown, 19 pages.

Satellite AR—Android Apps on Google Play, downloaded from web page: https://play.google.com/store/apps/details?id=com.agi.android.augmentedreality&hl=en, Download date: Oct. 20, 2017, original posting date: unknown, 3 pages.

* cited by examiner

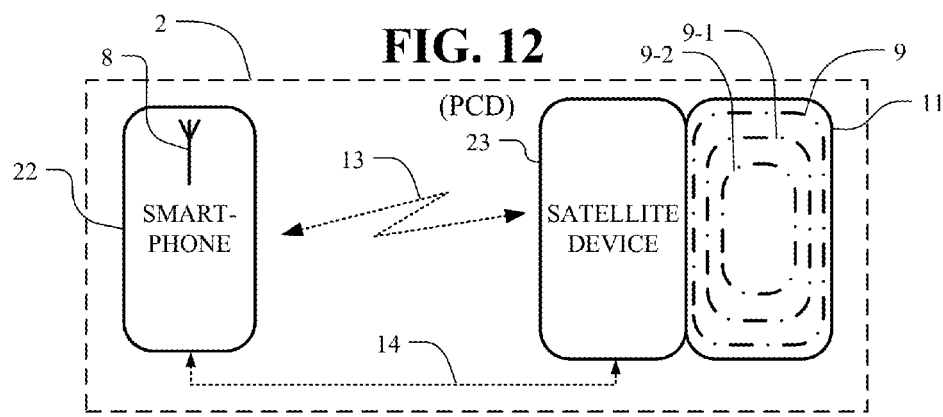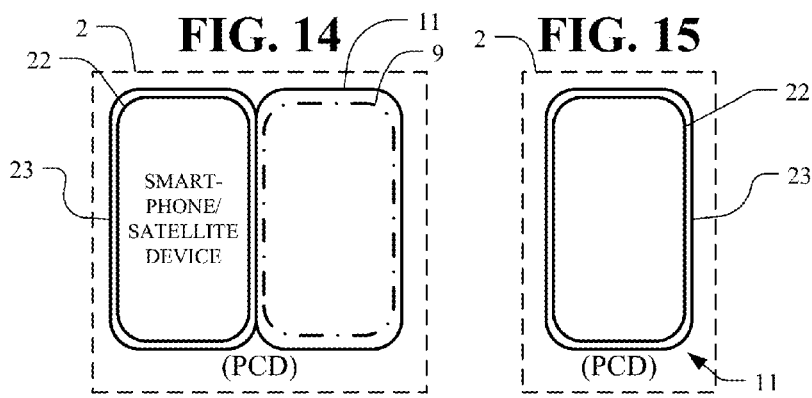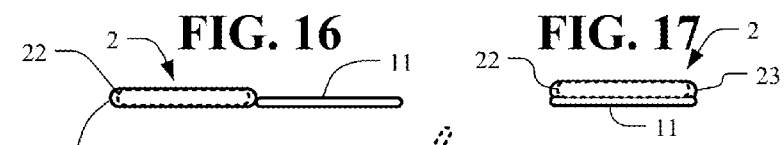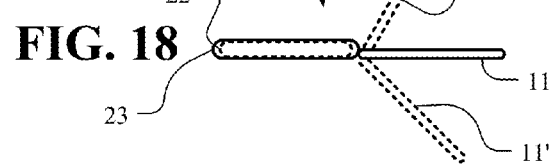

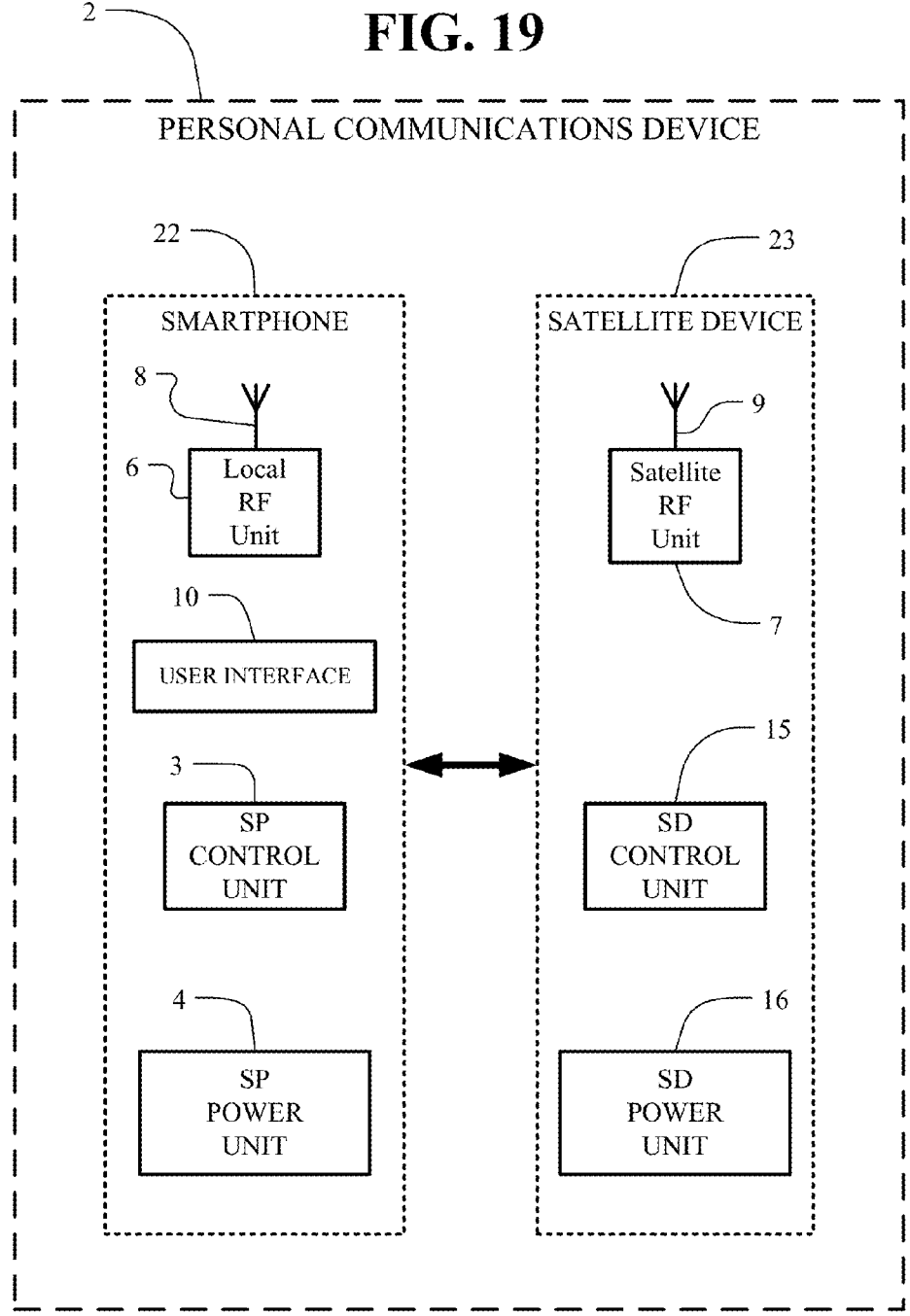

PERSONAL COMMUNICATIONS DEVICE FOR RELIABLE SATELLITE COMMUNICATIONS

This invention relates to mobile personal communications devices which can communicate reliably from most all locations of the world and more specifically to mobile, hand-held communications devices for communicating with satellites.

Mobile personal communications devices transmit and receive telephone calls and other communications using radio frequency (RF) signal channels that cover both small and large geographic areas. Such devices are moved around freely and are not required to stay in fixed locations. Some mobile personal communications devices support a wide variety of services such as voice, text messaging, multimedia, e-mail, maps, internet and numerous other and related applications for storing and retrieving contact information, calendar information, music, photography, records and other business and personal applications.

The demand and need for personal communications devices is expanding at a rapid pace. There are many billions of personal communications devices in use around the world. There is an increasing need for devices that provide reliable one-way and two-way communications virtually anywhere in the world even when any particular one or more types of channels are not available. Communications services primarily have been provided in channels using wired connections in the Public Switched Telephone Network (PSTN), using wireless connections in cellular networks and using wireless connections in satellite networks.

Satellite network channels provide alternative communications to cellular, PSTN and other terrestrial channels. Various satellites in constellations work together to provide coordinated ground coverage for wireless communications. Generally, satellite constellations are either Low Earth Orbiting satellites (LEDs) or geostationary satellites (GEOs).

Low Earth Orbiting satellites (LEDs) are often deployed with a substantial number of satellites in the constellation because the coverage area provided by a single LEO satellite is only a small area on the ground. The area on the ground covered by a single LEO satellite moves as the LEO satellite travels at a high angular velocity. A high angular velocity is needed in order to maintain the LEO satellite in orbit. Many LEO satellites are needed to maintain continuous coverage over regions on the ground. Globalstar and Iridium are companies that use LEO satellites.

Geostationary satellites (GEOs) are generally deployed with a lower number of satellites than LEO satellites since a single GEO satellite, moving at the same angular velocity as the rotation of the Earth's surface, provides permanent coverage over a large region on earth.

Globalstar has used a constellation of 48 LEO satellites that orbit the central hemisphere of the earth covering over 120 countries. Globalstar has used path diversity which allows the Globalstar phone to be linked to a number of satellites at one time so that when the line of sight is blocked to any one of the satellites another may be within the line of sight. In typical operation, a Globalstar satellite receives an up-link call from a ground mobile phone and transmits that call on a down-link to a ground station. The ground station delivers the call by land-line to the called ground phone. If the user of the Globalstar phone is calling another Globalstar phone, the call typically is an up-link to one satellite in the constellation, a down-link to the ground station, an up-link to another satellite in the constellation and finally a down-link to the called phone.

Iridium has used a constellation of 66 LEO satellites that orbit the poles and give coverage to almost all land masses and oceans of the world. The Iridium phone operates by taking an up-link call, handing off the call from satellite to satellite and then sending the down-link call to the closest Iridium ground station. The Iridium ground station sends the call through a land-line gateway over a land-line to the destination phone. If the user of the Iridium phone is calling another Iridium phone, then the call is handled by the satellite constellation without using the land-line gateway or a land line.

In general, mobile satellite personal communications devices require a line-of-sight from the mobile device to the satellite. For good service, at least an 80% view of the sky by the personal communications devices is preferable. Typically, the up-link and down-link communications frequencies to/from the satellites are in the VHF/UHF and/or microwave range. At these frequencies, many objects on land become obstructions to the communications. Objects such as very large boulders, earthen walls, mountains, trees, tunnels, vehicles and buildings or the like make satellite communications less reliable. Such obstructions can block signals between satellites and mobile satellite devices. The more the view of the sky is blocked, the more there will be periods of no service and dropped calls. The success in making calls from and to mobile satellite devices depends upon where the satellites are positioned relative to the mobile satellite devices at the moment a mobile satellite device is in use.

In consideration of the above background, there is a need for improved personal communications devices that can communicate using satellites from most all locations of the world even when other communications channels fail or are otherwise not available.

SUMMARY

The present invention is a personal communications device for communications using a satellite in a satellite communications system. The personal communications device includes a power unit for powering the personal communications device, a transceiver unit for communicating with the satellite, a control unit for controlling the personal communications device. The control unit includes a location algorithm for determining the satellite location and the personal communications device location, a path algorithm for predicting an improved communication path between the satellite and the personal communications device, a position change algorithm for determining a recommended change in position of the personal communications device so as to position the personal communications device in the improved communication path. The personal communications device includes a user output for communicating to the user the change in position recommended.

The present invention improves the reliability of the communications between personal communications devices and satellites. The reliability is improved by moving the mobile personal communications to the changed position. The personal communications device has improved communications by avoiding obstructions and by otherwise having a more reliable line of sight to the satellite. The personal communication device determines the location of obstructions and otherwise indicates to the user suggested movements whereby when the user moves the device a more reliable communications link to the satellite exists.

The apparatus provides user output which is, for example, a visual image in picture, graphic or text form and/or provides an auditory output which offers easy instructions on where or how to move the personal communications device to increase the reliability of the communications. The personal communication device has knowledge of the location of the personal communication device and of the satellite. Typically, the location of the personal communication device is determined by the Global Positioning System (GPS) but any other available locating means can provide the position information. The location of the satellite is determined by a satellite ephemeris, a table giving the coordinates of satellites, or by some other satellite locating means. Using the location information of the personal communication device and of the satellite, the line of sight, look direction, from the personal communication device to the satellite is determined.

With the look direction determined, the orientation of the communications device, and particularly its directional antenna, is determined. The repositioning may be as simple as changing the orientation of the communications device to match the preferred direction of the directional antenna to the look direction. The process of repositioning can be reinforced by providing a display of the satellite received signal strength indicator (RSSI).

The look direction or angle can be presented in many ways. For example, the presentation to the user is provided by one or more arrows or some other direction indicators on the visual screen of the personal communication device. When the communications device has been moved to line up better with the satellite, the arrow or other direction indicator provides an icon or other indication to show that the new location is better.

Another way to show improvement is via augmented reality. For example, an image of the sky is provided. The sky image includes an image, such as an icon, of the logically determined position of the satellite of interest if the orientation is such that the satellite should be in the sky image. If the logical position of the satellite does not appear in the sky image, then an arrow or arrow or other indicator suggests movement so that the satellite does show on the sky image.

The image of the sky is determined in a number of ways. In one embodiment, the image is created logically from internally stored data. In another embodiment, the image is derived from image sensor information sensed by an image sensor embedded in the personal communication device. The embedded image sensor can be visual, infrared or operate at other frequencies. The augmented position of the satellite on the image shows any obstruction positioned in the look direction line between the personal communication device and the satellite. It is easy for the user to recognize any obstruction and move the location or orientation so that the obstruction is no longer in the way.

The foregoing and other objects, features and advantages of the invention will be apparent from the following detailed description in conjunction with the drawings.

BRIEF DESCRIPTION OF THE DRAWINGS

FIG. 12 depicts a schematic representation of a top view of one embodiment a personal communications device of FIG. 2 as a combination of a smart phone and a satellite device.

FIG. 13 depicts a schematic representation of an end view of the personal communications device of FIG. 12.

FIG. 14 depicts a schematic representation of personal communications device of FIG. 12 where the smart phone and a satellite device are nested together with the antenna flap open.

FIG. 15 depicts a schematic representation of the personal communications device of FIG. 14 where the smart phone and a satellite device are nested together with the antenna flap closed.

FIG. 16 depicts a schematic representation of an end view of the personal communications device of FIG. 14.

FIG. 17 depicts a schematic representation of an end view of the personal communications device of FIG. 15.

FIG. 18 depicts a schematic representation of an end view of the personal communications device of FIG. 15 depicting by dotted lines the antenna rotated at different angles.

FIG. 19 depicts a schematic representation of a personal communications device formed as a combination of a smart phone and a satellite device.

DETAILED DESCRIPTION

Figure 1:
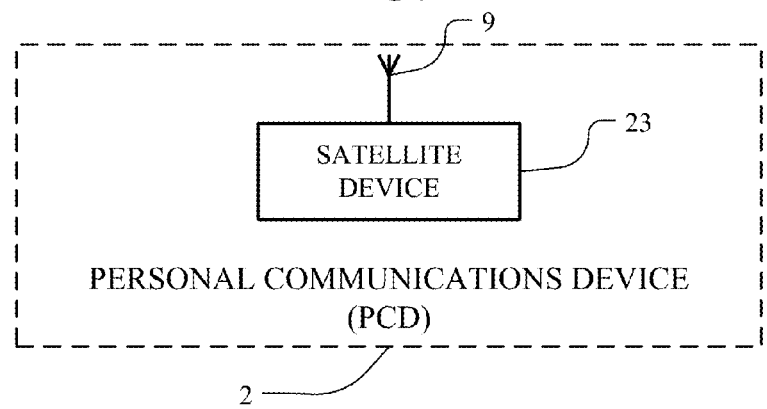
FIG. 1 depicts a schematic representation of a personal communications device for use with satellites.

In FIG. 1, personal communications device 2 includes a satellite device 23 and antenna 9 for communication with satellites.

Figure 2:
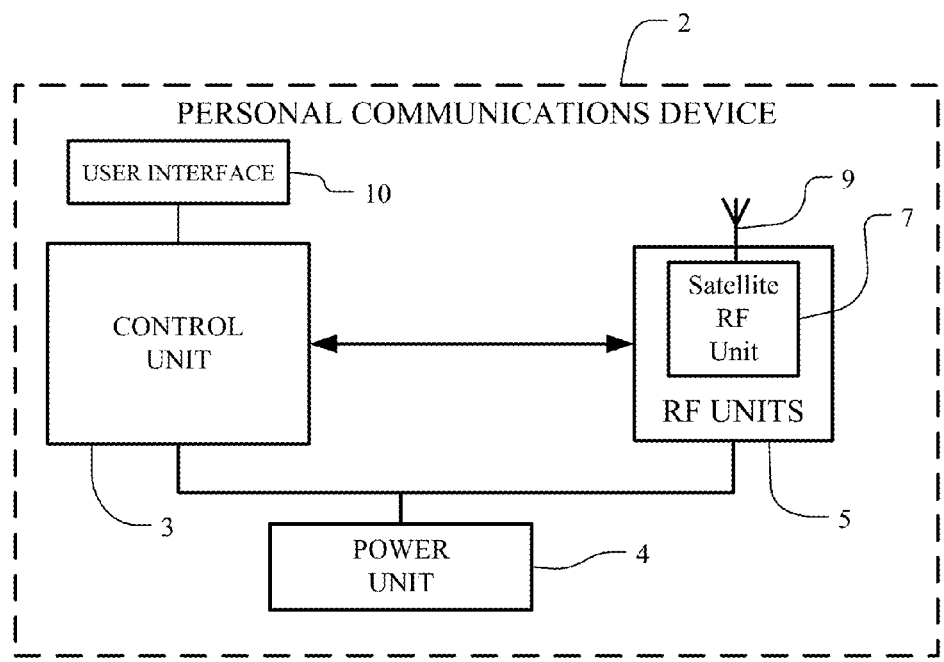
FIG. 2 depicts further details of the personal communications device of FIG. 1.

In FIG. 2, further details of an embodiment of the personal communications device 2 of FIG. 1 are shown. The personal communications device 2 includes a control unit 3, a power unit 4, a transceiver 5 and a user interface 10. The control unit 3 controls the communications of the personal communications device 2 and has the capacity to execute many different algorithms both hidden from user control and/or under user control. The power unit 4 includes one or more batteries to enable the personal communications device 2 to be portable. The transceiver 5 includes the components for communications in at least satellite communications systems through a satellite RF unit 7 and antenna 9. The user interface 10 includes any of a screen, a key pad, audio and other user input/output devices.

In FIG. 2, the device 2 executes a location algorithm for determining the satellite location and the personal communications device location, a path algorithm for predicting an improved communication path between the satellite and the personal communications device, a position change algorithm for determining a change in position of the personal communications device so as to position the personal communications device in the improved communication path. The device 2 includes a user output for communicating to the user the current position and any recommended change in position.

Figure 3:
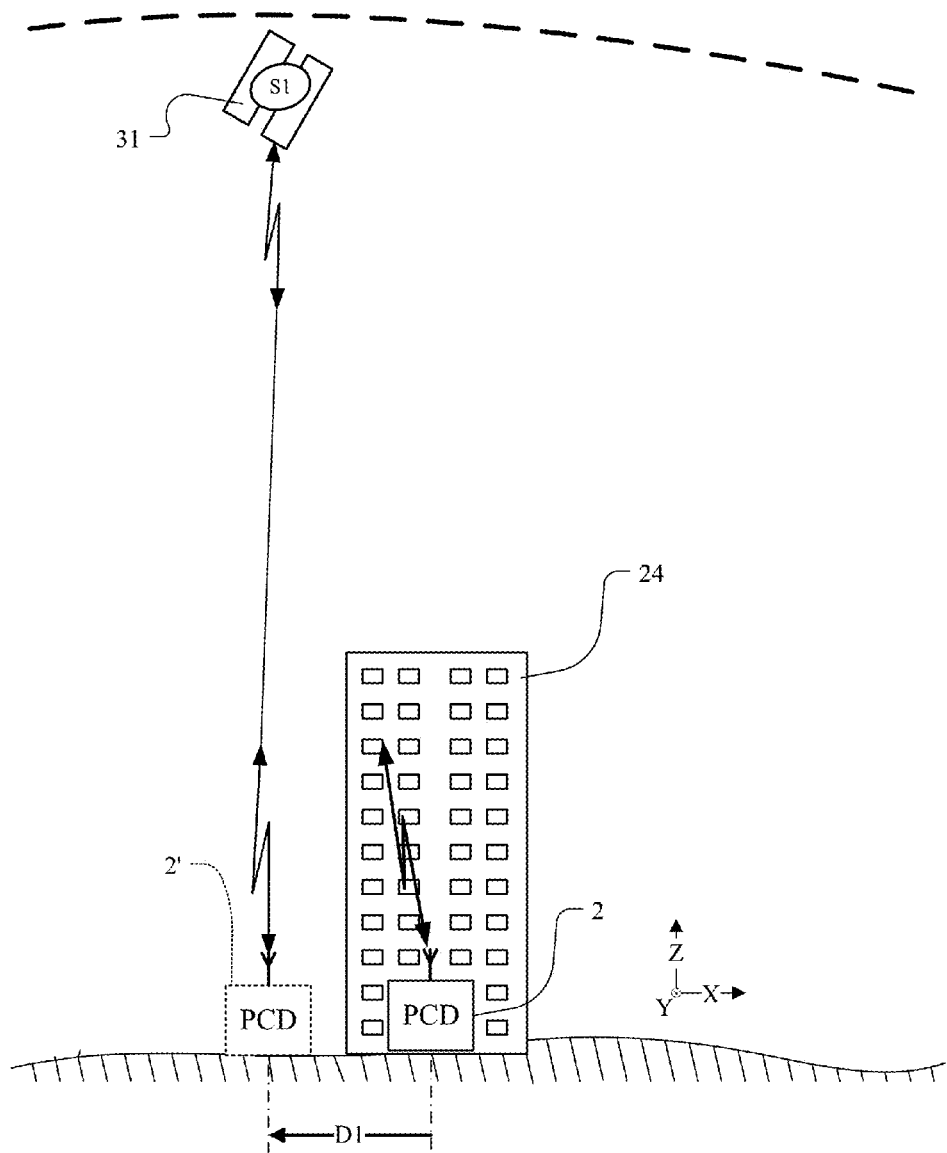
FIG. 3 depicts a schematic representation of a personal communications device of the FIG. 1 type deployed within communications range of a satellite communications system showing a change in position in one direction to avoid interference by a building.

In FIG. 3, the personal communications device 2 of the FIG. 1 and FIG. 2 type is deployed within communications range of a satellite communications system including satellite 31. The device 2 is located at a position relative to the building 24 which causes the building to interfere with communication between the satellite 31 and the device 2. The device 2 shown with solid lines is moved a first distance D1 in the X-axis direction to a new location shown with broken lines as device 2'. At the location of device 2', interference by a building 24 is avoided. The distance D1 in one example is 200 feet.

Figure 4:
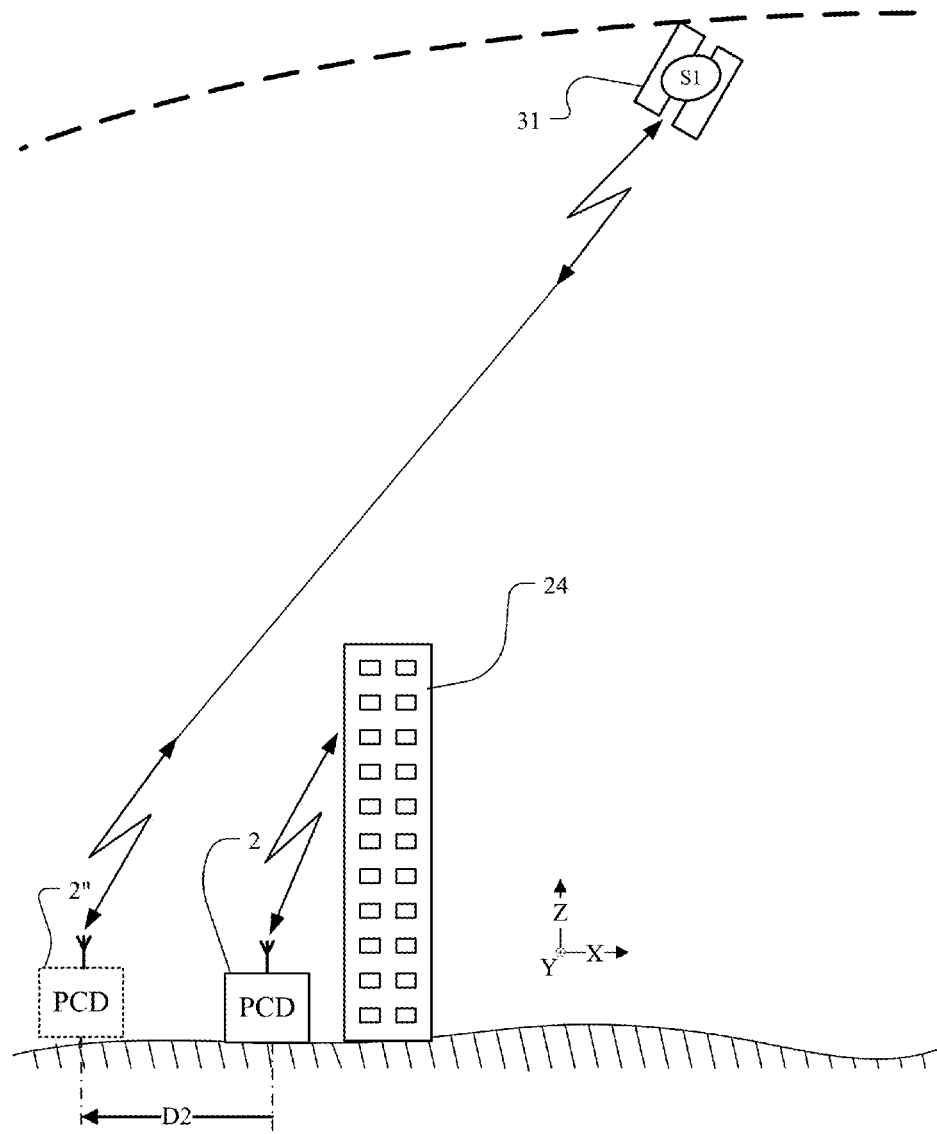
FIG. 4 depicts a schematic representation of a personal communications device of the FIG. 3 showing change in position in another direction to avoid interference by a building.

In FIG. 4, the personal communications device 2 of the FIG. 1 and FIG. 2 type is deployed within communications range of a satellite communications system including satellite 31. The device 2 is located relative to the building 24 which causes the building to interfere with communication between the satellite 31 and the device 2. The device 2 shown with solid lines is moved in the Y-axis direction a second distance D2 to a new location shown with broken lines as device 2". At the location of device 2", interference by a building 24 is avoided. The distance D2 in one example is 500 feet.

Figure 5:
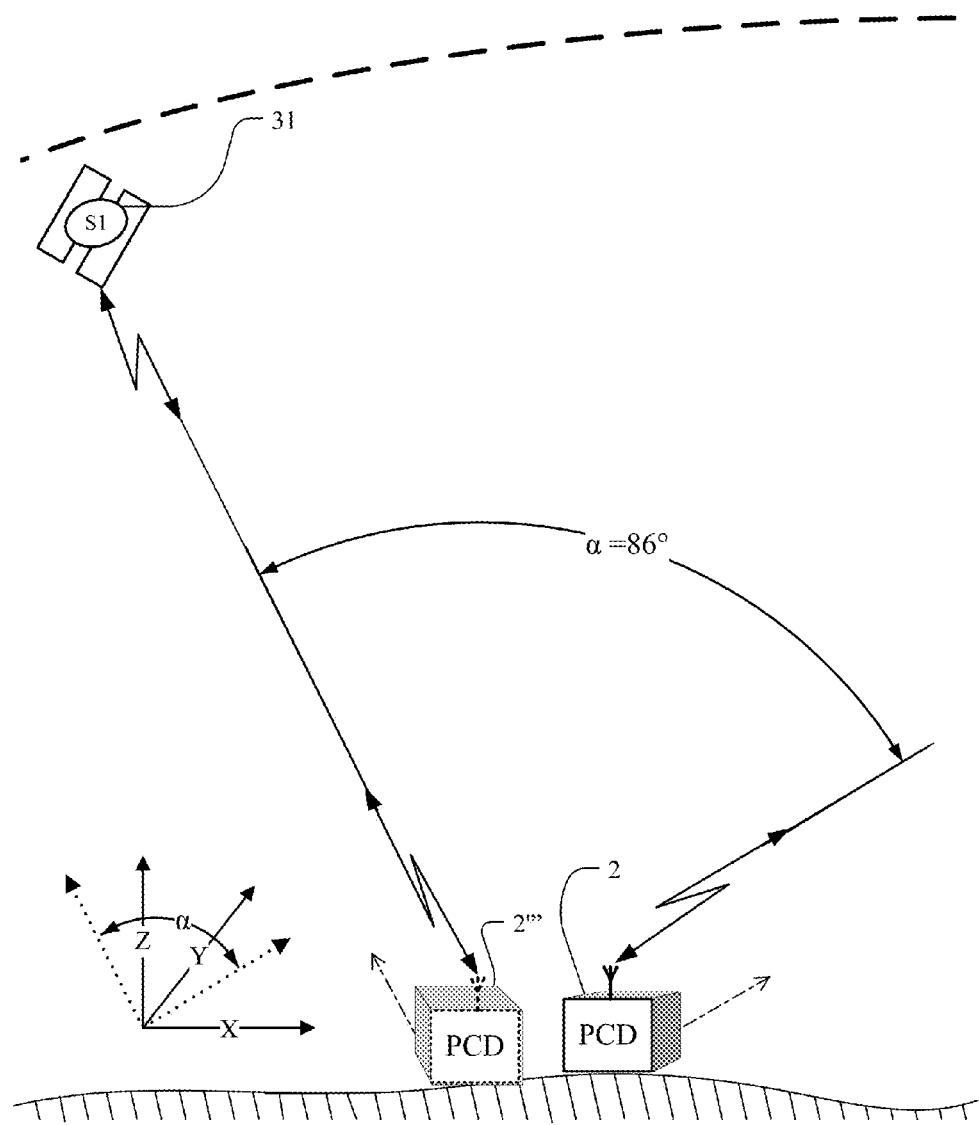
FIG. 5 depicts a schematic representation of a personal communications device of the FIG. 1 type deployed within communications range of a satellite communications system showing a change in orientation to acquire a stronger satellite signal.

In FIG. 5, the personal communications device 2 of the FIG. 1 and FIG. 2 type is deployed within communications range of a satellite communications system including satellite 31. The device 2 is oriented relative to the satellite 31 so that poor communication exists between the satellite 31 and the device 2. The device 2 shown with solid lines is rotated by an angle α, equal to 86° in one example, to a new orientation shown with broken lines as device 2'''. At the location of device 2''', improved signal strength with the satellite 31 is achieved.

Figure 6:
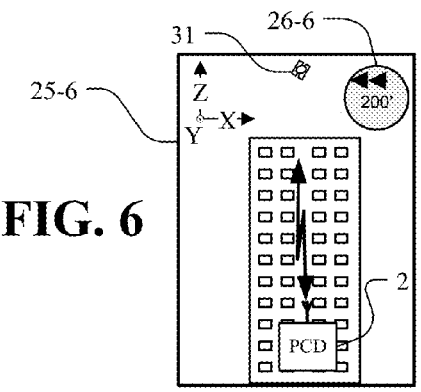
FIG. 6 depicts a screen representation of a personal communications device showing the display image of the FIG. 3 environment with a recommended change in position in one direction to avoid interference by a building.

In FIG. 6, a display image 25-6 displayed in user interface 10 by the personal communications device 2 in FIG. 3 shows the display image of the FIG. 3 environment with a recommended change in position image 26-6. The image 26-6 indicates with arrows and a number a recommended move in an X-axis direction, to the viewer's left, by a distance D1 of 200' to avoid interference by building 24.

Figure 7:
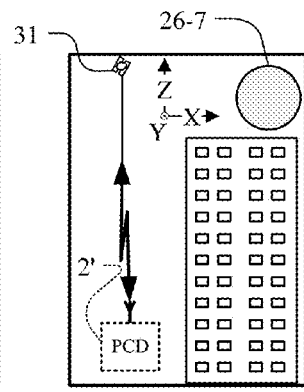
FIG. 7 depicts a screen representation of a personal communications device showing the display image of the FIG. 3 environment after the change in position in one direction to avoid interference by a building.

In FIG. 7, a display image 25-7 displayed by the personal communications device 2' in FIG. 3 shows the display image of the FIG. 3 environment after the change in position in the X-axis direction of D1 equal to 200' recommended in the image 26-6 of FIG. 6. The image 26-7 is blank, or alternative shows some icon, to indicate that no change in position is recommended for the device 2'.

Figure 8:
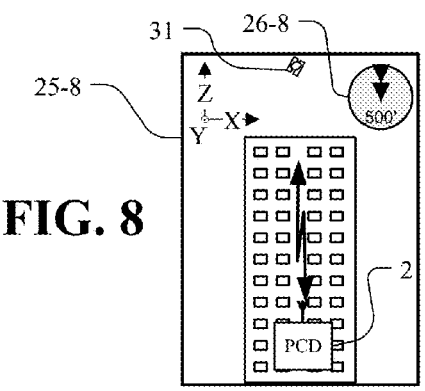
FIG. 8 depicts a screen representation of a personal communications device showing the display image of the FIG. 4 environment with a recommended change in position in another direction to avoid interference by a building.

In FIG. 8, a display image 25-8 displayed by user interface 10 in the personal communications device 2 in FIG. 4 shows the display image of the FIG. 4 environment with a change in position image 26-8 recommending a move in a Y-axis direction normal to the plane of the image, backward from the viewer, by a distance D2 of 500'. The image 26-8 indicates with arrows and a number the recommended backward to avoid interference by building 24.

Figure 9:
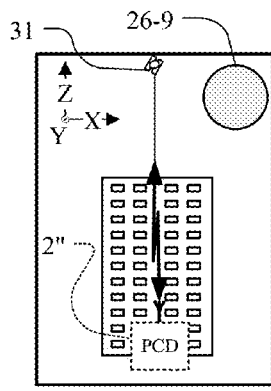
FIG. 9 depicts a screen representation of a personal communications device showing the display image of the FIG. 4 environment after the change in position in another direction to avoid interference by a building.

In FIG. 9, a display image 25-9 displayed by user interface 10 in the personal communications device 2" in FIG. 4 shows the display image of the FIG. 4 environment after the change in position of D2 equal to 500' recommended in the image 26-8 of FIG. 6. The image 26-9 is blank, or alternative shows some icon, to indicate that no change in position is recommended for the device 2".

Figure 10:
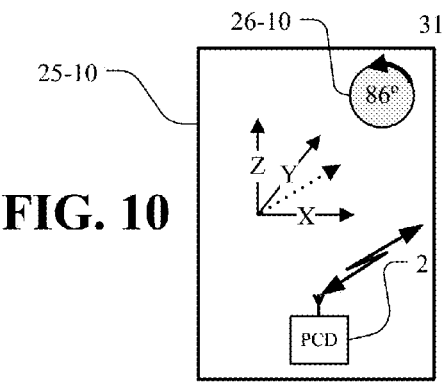
FIG. 10 depicts a screen representation of a personal communications device showing the display image of the FIG. 5 environment with a recommended change in orientation to acquire a stronger satellite signal.

In FIG. 10, a display image 25-10 displayed by user interface 10 in the personal communications device 2 in FIG. 5 shows the display image of the FIG. 5 environment with a recommended change in position image 26-10. The image 26-10 indicates with a circular arrow and a number a recommended move in orientation by an angle α counterclockwise by 86° in the XY-plane, the plane of the ground the user is on, to improve communication between the personal communications device 2 and the satellite 31.

Figure 11:
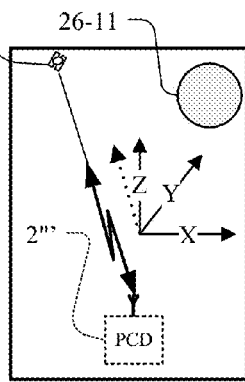
FIG. 11 depicts a screen representation of a personal communications device showing the display image of the FIG. 5 environment after the change in orientation to acquire a stronger satellite signal.

In FIG. 11, a display image 25-11 displayed by user interface 10 in the personal communications device 2''' in FIG. 5 shows the display image of the FIG. 5 environment after the change in orientation by an angle α counterclockwise by 86° in the XY-plane as recommended in the image 26-10 of FIG. 10. The image 26-11 is blank, or alternative shows some icon, to indicate that no change is recommended for the device 2'''.

In FIG. 12, a schematic representation of a view of one embodiment of the personal communications device 2 of FIG. 2 is shown. In FIG. 12, the personal communications device 2 includes a smartphone 22 and a satellite device 23. The personal communications device 2, in one embodiment described, is fully distributed where the smartphone 22 is essentially a standalone device like Apple's i-phone, Samsung's Galaxy or other readily available smartphones. In this fully distributed embodiment, the smartphone 22 communicates with the satellite device 23 with an RF link 13 (such as Bluetooth, WiFi, NFC or other link) through the Bluetooth, WiFi, NFC or other facilities of the smartphone 22 and satellite device 23 or by a direct wire connection 14 through the wire plug connections of the smartphone 22 and satellite device 23. The satellite device 23 includes an area, such as flap 11, that contains the satellite antenna 9. The flap 11 in some embodiments includes multiple antennas 9, 9-1, 9-2 and so on having sizes and properties suitable for different ones of the satellite frequencies of satellite communications systems.

For local communications, the personal communications device 2 in FIG. 12 typically includes all the features of a smartphone and is thereby able to communicate in local environments using cellular or other local communications systems. Examples of such smartphones are Apple's i-phone using the Apple operating system and Samsung's Galaxy using the Android operating system. Many other smartphones are available or are becoming available using the Apple, Android or other operating systems.

In FIG. 13, a schematic representation of an end view of the personal communications device 2 of FIG. 12 is shown. The smartphone 22 and the satellite device 23 are represented for purposes of illustration as separated by a distance. The distance in actuality may be of any amount from nothing to numbers of meters depending upon the embodiment selected. The distance, however, cannot exceed the communication range of the RF connection 13 or the wired connection 14.

In FIG. 14, a schematic representation of personal communications device 2 of FIG. 12 is shown where the smartphone 22 and the satellite device 23 are superimposed and nested together without any separation. The flap 11 holding the satellite antenna 9 is shown in the fully open position.

In FIG. 15, a schematic representation of an end view of the personal communications device 2 of FIG. 6 is shown where the smartphone 22 and the satellite device 23 are superimposed and nested together without any separation. The flap 11 is shown in the closed position.

In FIG. 16, a schematic representation of an end view of the personal communications device 2 of FIG. 14 is shown where the smart phone 22 and the satellite device 23 are nested together with the antenna flap 11 open and adjacent the superimposed smart phone 22 and satellite device 23.

In FIG. 17, a schematic representation of an end view of the personal communications device 2 of FIG. 15 is shown. The smart phone 22 and the satellite device 23 are nested together with the antenna flap 11 closed and under the superimposed smart phone 22 and satellite device 23.

In FIG. 18, a schematic representation of an end view of the personal communications device 2 of FIG. 14 is shown. The flap 11 is in a fully open position and can be rotated as depicted by dotted lines. The flap 11 is rotated in one direction to the position shown as 11' and is rotated in the opposite direction to the position shown as 11". The rotation of the flap 11 and therefore the antenna 9 assists in changing the orientation of the satellite device 23 and providing good communication between the personal communications device 2 and a satellite 31.

In FIG. 19, a schematic representation of a personal communications device 2 formed as a combination of a smart phone 22 and a satellite device 23 is shown. The smartphone 22 includes a local RF unit 6, a user interface 10, a SP control unit 3 and a SP power unit 4. The local RF unit 6 operates to communicate with local communication systems such as cellular systems. The user interface 10 operates with inputs from and outputs to a user. For example, the inputs include keypad and audio inputs and the outputs include display and audio outputs. The SP control unit 3 includes a processor, storage and related devices for controlling operations of the smartphone 22 and the personal communications device 2. The SP control unit 3 executes code including algorithms useful or necessary for control operations. The SP power unit 4 includes a battery and other components for powering the smartphone 22 and the personal communications device 2.

The satellite device 23 includes a satellite RF unit 7, a SD control unit 15 and an SD power unit 15. The satellite RF unit 7 operates to communicate with satellite communication systems such as LEO and GEO systems. The satellite device 23 operates for user interface operations under control of the user interface 10 of smartphone 22. In alternate embodiments, satellite device 23 can include a user interface. The SD control unit 15 includes a processor, storage and related devices for controlling operations of the satellite device 23 and the personal communications device 2. The SD control unit 15 executes code including algorithms useful or necessary for control operations. The SD power unit 16 includes a battery and other components for powering the satellite device 23 and the personal communications device 2.

Figure 20:
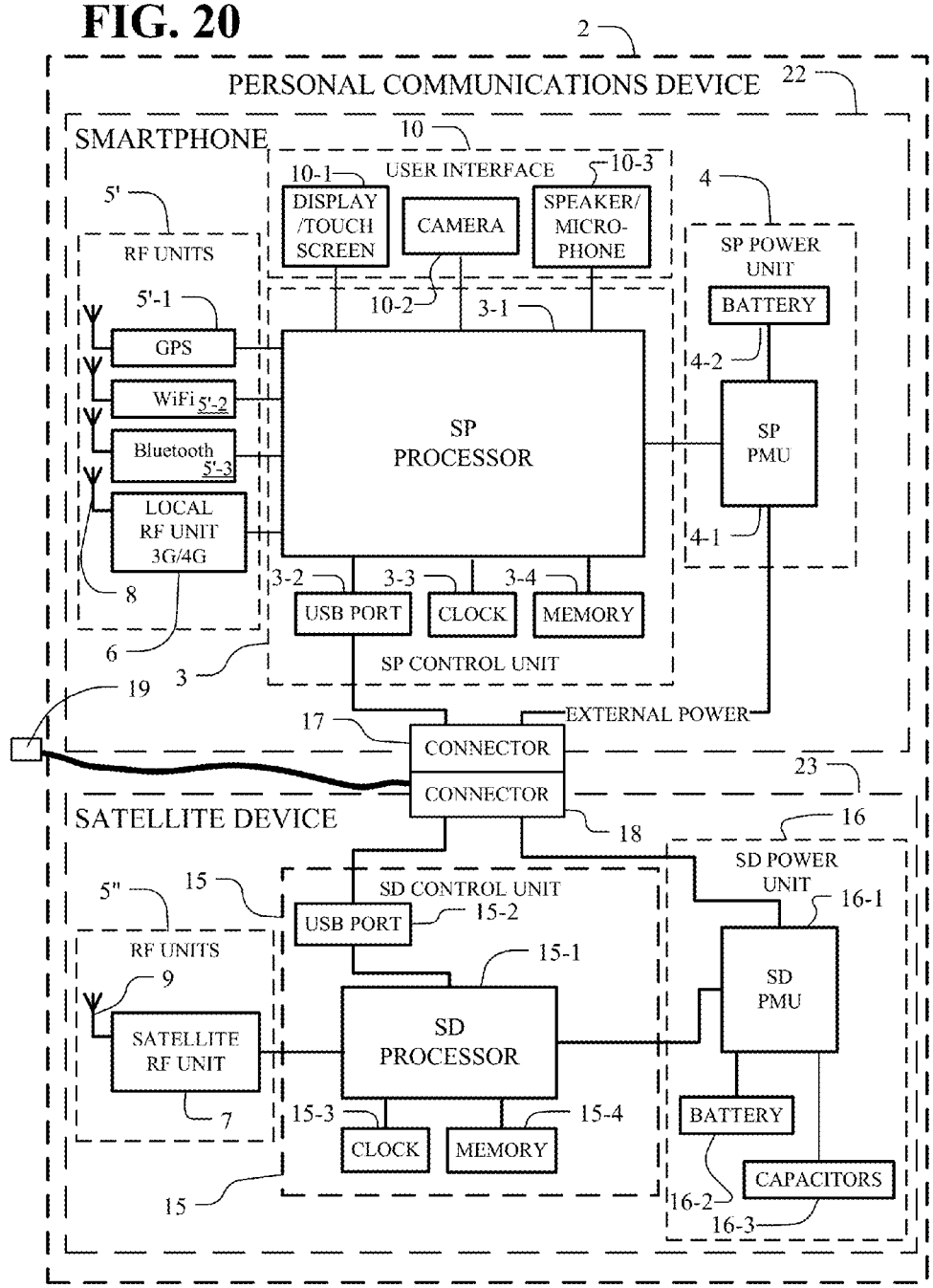
FIG. 20 depicts a schematic block diagram representation of further details of the personal communications device of FIG. 19.

In FIG. 20, a schematic block diagram representation of further details of the FIG. 19 personal communications device 2 is shown.

In FIG. 20, the smartphone 22 includes RF units 5', a user interface 10, a SP control unit 3 and an SP power unit 4. The RF units 5' includes a GPS unit 5'-1, a WiFi unit 5'-2, a Bluetooth unit 5'-3 and a local RF unit 6. The local RF unit 6 operates to communicate with local communication systems such as cellular systems. The user interface 10 includes a display/touch screen 10-1, a camera 10-2 and a speaker/microphone 10-3 and operates with inputs from and outputs to a user. For example, the inputs include keypad and audio inputs and the outputs include display and audio outputs. The SP control unit 3 includes a processor, storage and related devices for controlling operations of the smartphone 22 and the personal communications device 2. The SP control unit 3 executes code including algorithms useful or necessary for control operations. The SP power unit 4 includes a power management unit 4-1 and a battery 4-2 for powering the smartphone 22 and the personal communications device 2.

In FIG. 20, satellite device 23 includes RF units 5", an SD control unit 15 and an SD power unit 16. The RF units 5" include at least a satellite RF unit 7. The satellite RF unit 7 operates to communicate with satellite communication systems such as LEO and GEO systems. The SD control unit 15 includes a processor 15-1, a USB port 15-2, a clock 15-3 and storage including memory 15-4. The SD control unit 15 operates to control operations of the satellite device 23 and the personal communications device 2. The SD control unit 15 executes code, stored in memory 15-4, for performing algorithms useful or necessary for control operations. The SD power unit 16 includes an SD power management unit (PMU) 16-1, a battery 16-2 and super capacitors 16-3 for powering the satellite device 23 and the personal communications device 2. The satellite device 23 connects through connector 18 to the connector 17 of the smartphone 22. In one embodiment, the connector 18 is connected to a terminal 19 which provides the ability to recharge the battery 16-2 and capacitors 16-3 in the satellite device 23 and the battery 4 in the smartphone 22.

Figure 21:
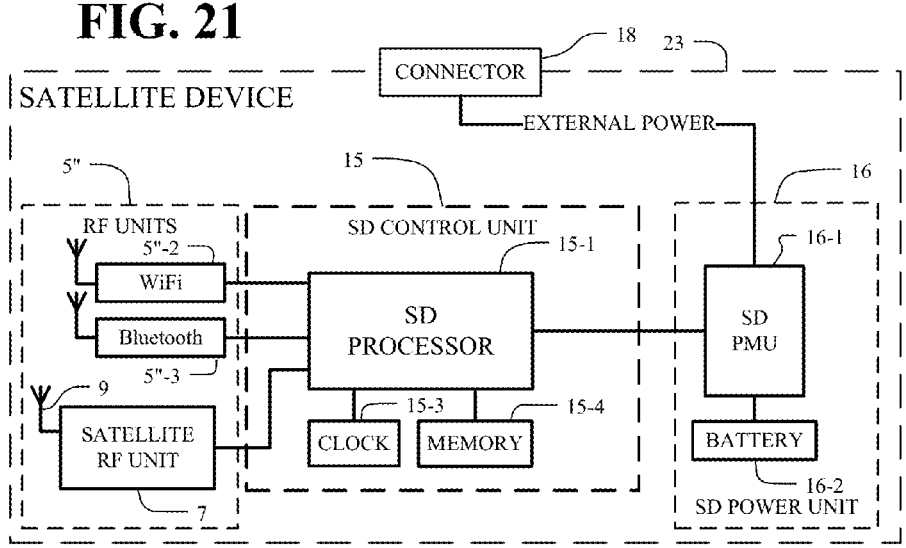
FIG. 21 depicts a schematic representation of another embodiment of the satellite device for use in the personal communications devices of the FIG. 20.

In FIG. 21, a schematic representation is shown of another embodiment of a satellite device 23 for use in the personal communications device 2 of FIG. 20. The satellite device 23 includes RF units 5", an SD control unit 15 and an SD power unit 16. The RF units 5" include a WiFi unit 5"-2, a Bluetooth unit 5"-3 and a satellite RF unit 7. The satellite RF unit 7 operates to communicate with satellite communication systems such as LEO and GEO systems. The WiFi unit 5"-2 and a Bluetooth unit 5"-3 are available for communicating with the WiFi unit 5'-2 and Bluetooth unit 5'-3 of the smartphone 22 of FIG. 20. The interaction between the smartphone 22 and the satellite device 23 is controlled by the Bluetooth and/or WiFi RF connections. The SD control unit 15 includes a processor 15-1, a clock 15-3 and storage including memory 15-4. The SD control unit 15 operates to control operations of the satellite device 23 and the personal communications device 2. The SD control unit 15 executes code, including algorithms useful or necessary for control operations, stored in memory 15-4. The SD power unit 16 includes an SD power management unit (PMU) 16-1 and a battery 16-2 for powering the satellite device 23 and the personal communications device 2.

Figure 22:
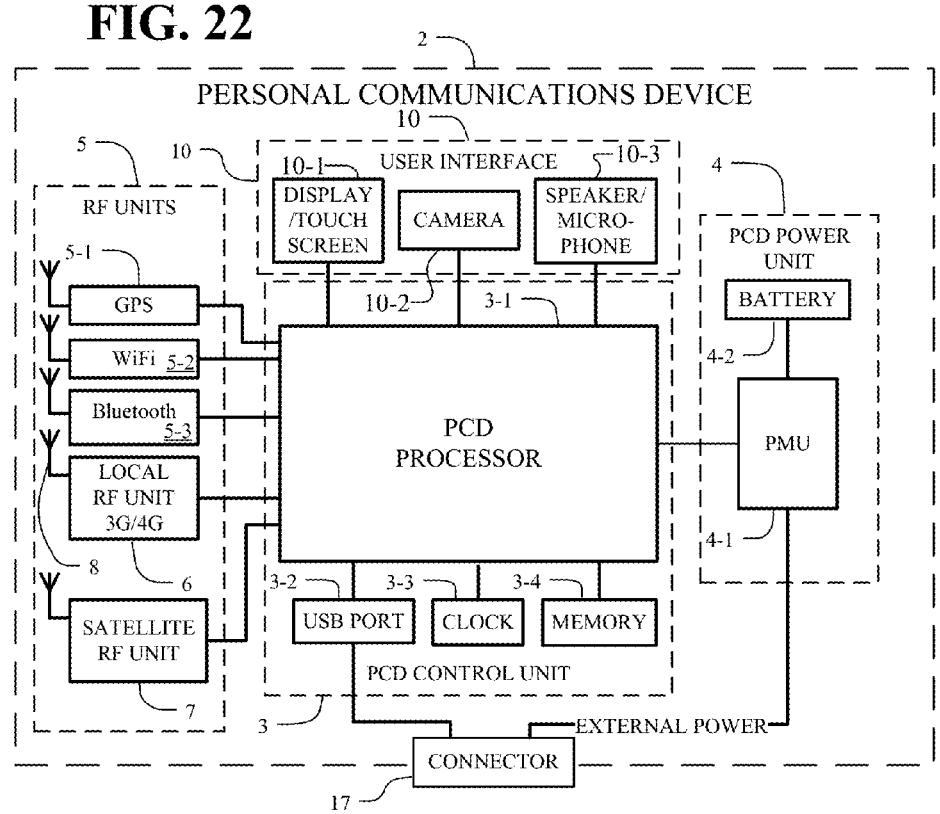
FIG. 22 depicts a schematic representation of another embodiment of a personal communications device of FIG. 19 where the local RF unit and the satellite RF unit are under common control in the same device.

In FIG. 22, a schematic representation is shown of another embodiment of a personal communications device 2 where the local RF unit 6 and the satellite RF unit 7 are under common control of the PCD control unit 3. In FIG. 22, the personal communications device 2 includes RF units 5, a user interface 10, a PCD control unit 3 and an PCD power unit 4. The RF units 5 include a GPS unit 5-1, a WiFi unit 5-2, a Bluetooth unit 5-3 and a local RF unit 6. The local RF unit 6 operates to communicate with local communication systems such as cellular systems. The user interface 10 includes a display/touch screen 10-1, a camera 10-2 and a speaker/microphone 10-3 and operates with inputs from and outputs to a user. For example, the inputs include keypad and audio inputs and the outputs include display and audio outputs. The PCD control unit 3 includes a processor, storage and related devices for controlling operations of the personal communications device 2. The PCD control unit 3 executes code including algorithms useful or necessary for control operations. The PCD power unit 4 includes a power management unit 4-1 and a battery 4-2 for powering the smartphone 22 and the personal communications device 2.

Figure 23:
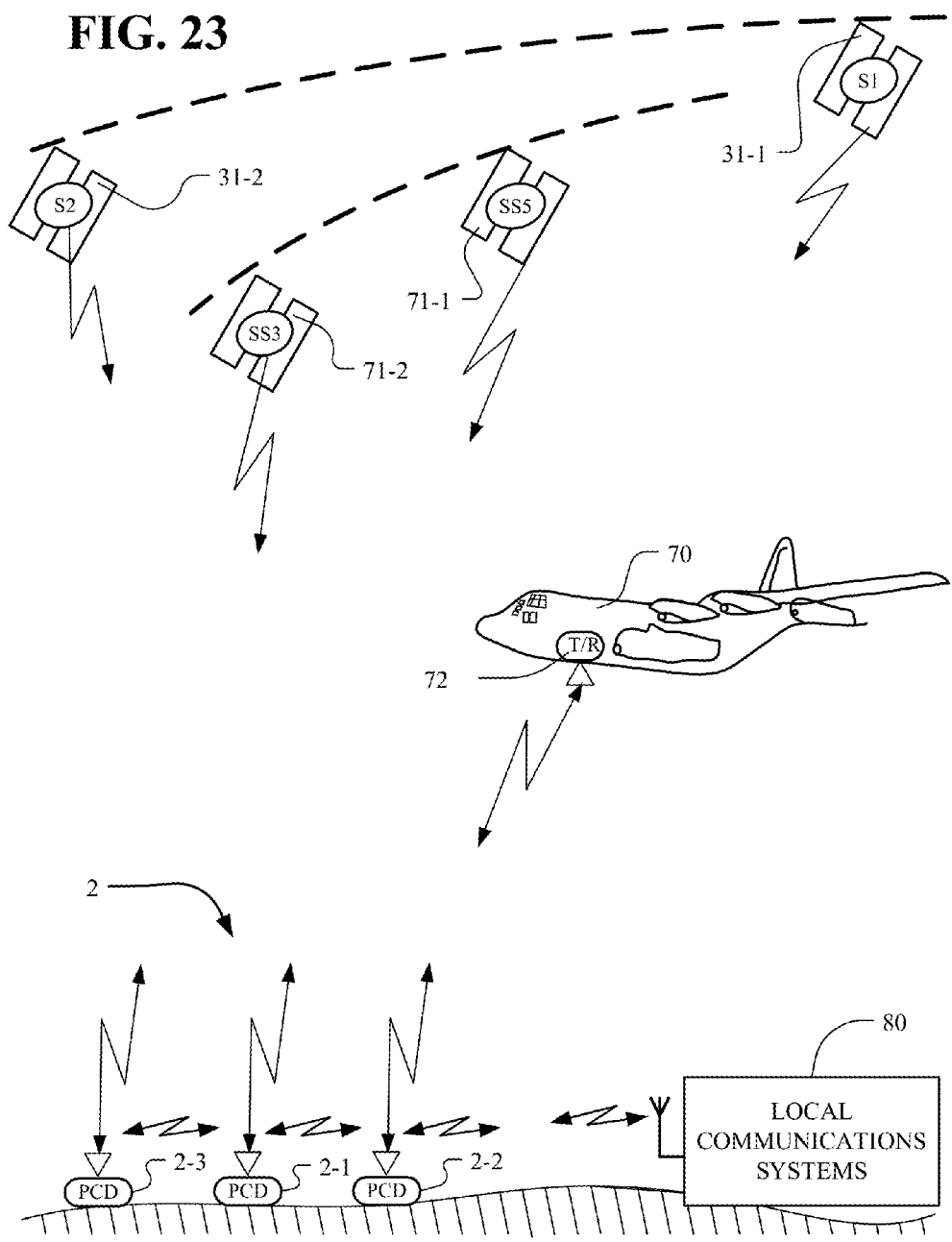
FIG. 23 depicts a schematic representation of personal communications devices of the FIG. 1 type deployed within communications range of multiple communications systems including terrestrial local communications systems, airborne systems and multiple satellite communications systems.

In FIG. 23, a schematic representation is shown of personal communications devices 2 deployed within communications range of multiple communications systems. The communications systems of FIG. 23 include local communications systems 80. In one embodiment, the local communications system 80 is a cellular system. In the cellular system, the personal communications devices 2, including devices 2-1, 2-2 and 2-3, communicate in small geographic areas called cells. Each cell covers a small geographic area and collectively an array of adjacent cells covers a larger geographic region. The local communications systems 80 include Base Station (BS) which handle all the cellular calls for the personal communications devices 2.

The communications systems of FIG. 23 in some embodiments include local communications systems for emergency, search and rescue such as Civil Air Patrol, Marine, Mountain Rescue, Fire and Police. The air patrol communicates from an aircraft 70 having a local RF transceiver 70. The communications systems of FIG. 23 in some embodiments include one or more satellite communications systems. For example, the GEO satellites 31-1 and 31-2 are in a GEO orbit and the LEO satellites 71-1 and 71-2 are in a LEO orbit.

Figure 24:
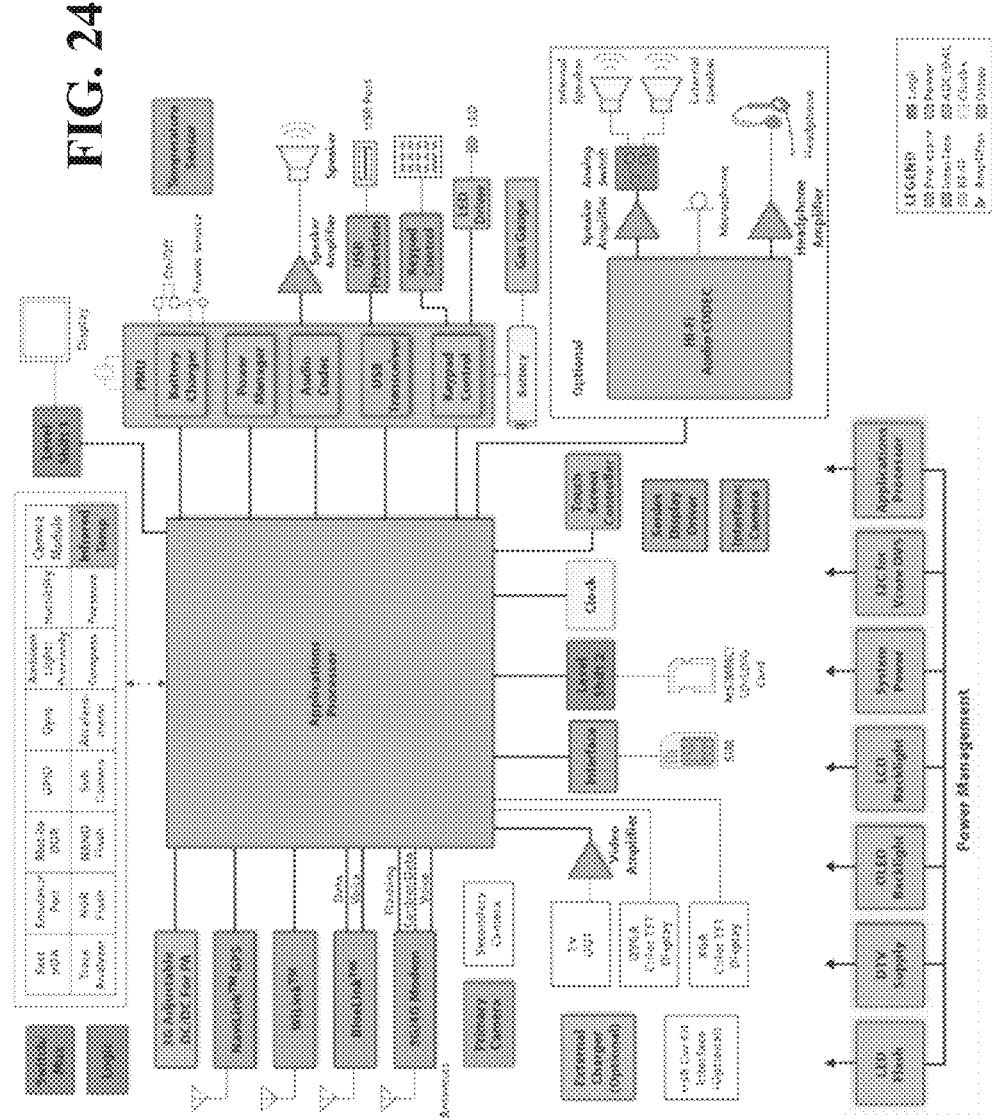
FIG. 24 depicts a detailed block diagram of a conventional smartphone.

In FIG. 24, a detailed block diagram is shown of a conventional smartphone. The block diagram is published by Texas instruments at:

http://www.ti.com/solution/handset_smartphone#

The operation of personal communications devices 2 requires execution of code in the one or more processors such as the SP processor 3-1, the SD processor 15-1 of FIG. 20 or the PCD processor 3-1 of FIG. 22. The selection of which one or ones of the processors to employ for execution code is a matter of design choice.

The execution code includes a location algorithm for determining the satellite location and the personal communications device location. In one example, the device location is determined from GPS information and the satellite location is determined by a table look-up from a stored table of satellite location information.

A path algorithm for predicting an improved communication path between the satellite and the personal communications device in one example determines a straight line from the personal communications device location to the satellite location. Although the satellite antennas 9 of the personal communications devices 2 are generally omnidirectional, they tend to have an optimal directionality so that some improvement is achieved by changing the orientation of the antenna to point directly toward the satellite.

A position change algorithm determines a recommended change in position of the personal communications device so as to position the personal communications device in an improved position. The improved position can be a simple rotation to align the antenna angle with the line-of-sight angle as described in connection with FIG. 10 and FIG. 11. In such example, the position change algorithm determines the line-of-sight angle and the preferred angle of the antenna and then subtracts one from the other to form the difference. The difference is then communicated to the user as the recommended change in angular position.

When communicating with satellites, a) the GPS location and the 3d orientation of the phone and b) the location of the satellite are known. This information allows the user to point the phone in the optimal direction toward the satellite for best communications gain. The satellite pointing code is executed using this information to perform the Satellite Pointing Algorithm (SPA). The SPA provides guidance in a user friendly way so that the user can reposition the orientation of the personal communications devices 2 as needed.

The following are examples of additional functions to be carried out by execution of code in the personal communications devices 2 represented by the personal communication device of FIG. 20.

Low Signal Code. Under normal high signal strength operation, the personal communications device 2 is operating in local cellular communications mode and the satellite communications is silent. When the received signal strength indicator (RSSI) in the smartphone 2 indicates that the cellular network communication strength is below a threshold, it suggests that sending or receiving a message via the local cellular network is not likely to get through. This low level signal strength indication is detected and initiates the Low Signal Code Algorithm (LSA).

In most cases, the LSA will immediately begin the satellite communications process. This process entails a) putting the local cellular communicator in the smartphone 22 in airplane mode, turning OFF the cellular radio in the smartphone 22; b) waking up the L band transverter in the satellite RF unit 7 of the satellite device 23; c) begin executing the transaction processing code for the transaction processing algorithm (TPA) and d) update the user screen in the smartphone 22 providing the user with new options that come with the satellite communications application. Examples of options include Google SMS search, email indexing and Mayday call-out.

The LSA does not begin the satellite process when the RSSI signal strength indicator is intermittently adequate. In such cases, test code using hysteresis of the RSSI signal strength indicator will evaluate the need to switch to satellite communications. As a result of the test, a decision to switch to satellite mode is made. Similarly, if the RSSI signal strength indicator test indicates that cellular communications can be performed while the communications is in satellite mode, a decision will be made whether to switch to cellular mode.

Low Energy Code. When the smartphone 22 has a low battery level, the energy monitoring code will initiate the Low Energy Algorithm. The energy monitoring code will check the RSSI indicator to evaluate the cellular communications signal strength. If the cellular communications signal strength is also low, a message is displayed on the display/touch screen 10-1 of smartphone 22 indicating that the smartphone 22 will be placed in Airplane Mode to conserve energy. This operation allows the smartphone 22 to retain adequate energy to complete a satellite message when needed.

Mayday Emergency Code. In order to respond to a significant emergency, a special input is provided to override and take priority over all other functions. The special input in one embodiment is a "Mayday Button" touch screen button displayed on the display/touch screen 101 of the smartphone 22. Alternatively, the satellite device 23 includes a physical button (not shown) that provides a "Mayday Signal" to activate the Mayday Code. Upon activation, the mayday code will execute the Mayday Processor Algorithm (MPA). In such case, the MPA will a) get a GPS fix on the location of the personal communications device 2, b) evaluate all communications paths to find out which communications paths are feasible; c) calculate satellite positions of appropriate satellites; d) evaluate the nature of the emergency, for example, by posing a small number of questions (four to five) to the user; e) select and then activate all appropriate transmitters and receivers.

Occlusion Code. In general, when there is clear sky between the personal communications devices 2 and the satellite, the messages to the satellite will get through. However, when there is an object of size (and bulk) in between the personal communications devices 2 and the satellite, the signal may or may not get through. The sensing of an occlusion is achieved by an Occlusion Algorithm using images from the camera 10-2, the view angle as determined by the Satellite Pointing Algorithm and execution of pattern recognition.

In some cases, the Occlusion Algorithm will be able to recognize a problem and provide some suggestions to the user for repositioning. Often the suggestions are as simple as "move right" or "move left". Sometimes the guidance to the user will be more complex as generally described in connection with FIG. 3 through FIG. 11.

Battery Management Code. Battery management code performs a Battery Management Algorithm (BMA) which keeps track of energy spent and energy available. The BMA determines the energy required to communicate by cellular and by satellite. The BMA determines the current charge state of the batteries, battery 4-2 in the smartphone 4-2 and battery 16-2 in the satellite device 16-2. The BMA also manages the charging of the capacitors FIG. 24-3 (when needed) and the recharging of all batteries and capacitors. An external plug 19 is provided to power the personal communications devices 2 in emergency conditions.

Transaction Processing Code. When satellite messages are sent or received, charges for this service are applied. The reimbursement for these charges will be by credit or debit card. However, in most cases, the transaction information will be stored on the personal communications devices 2 and maintained until the next time that the personal communications devices 2 is within cellular range. Typically, the transaction costs and other data are not sent over the satellite channel. When the personal communications devices 2 is within cellular range, the accumulated transactions and charges are dumped to a processing center such as Paypal or Square which will complete payments and processing for the transactions.

While the invention has been particularly shown and described with reference to preferred embodiments thereof it will be understood by those skilled in the art that various changes in form and details may be made therein without departing from the scope of the invention.

The invention claimed is:

1. A personal communications device including a capability to communicate using a satellite in a satellite communication system, the personal communications device comprising:
    a power unit configured to provide power to the personal communications device;
    a transceiver unit configured to enable communication with the satellite;
    a control unit configured to control the personal communications device, wherein the control unit is configured to:
    determine a location of the satellite and a location of the personal communications device, predict an improved communication path between the satellite and the personal communications device, and
    determine a recommended change in position of the personal communications device so as to position the personal communications device in the improved communication path; and
    a user output configured to communicate to the user the change in position to position the personal communications device in the improved communication path, wherein the user output includes an augmented reality display, wherein the augmented reality display is configured to show a sky image and to provide an indicator to suggest movement to bring an icon representing the satellite into the sky image of the augmented reality display.

2. The personal communications device of claim 1, wherein the control unit comprises:
    a processing device; and
    a memory coupled to the processing device, the memory containing instructions executable by the processing device to cause the processing device to implement operations including to determine the locations of the satellite and the personal communications device, to predict the improved communication path between the satellite and the personal communications device, and to determine the recommended change in position of the personal communications device.

3. The personal communications device of claim 1, wherein the location of the personal communications device is determined using Global Positioning Satellite system (GPS) data.

4. The personal communications device of claim 1, wherein the location of the satellite is determined based on a stored table of satellite location information.

5. The personal communications device of claim 1, wherein the improved communication path is a straight-line path between the satellite and the personal communications device.

6. The personal communications device of claim 1, wherein the recommended change in position of the personal communications device comprises at least one of a rotation or a physical relocation of the personal communications device.

7. The personal communications device of claim 1, further comprising a further transceiver configured to communicate via at least one communication system different from the satellite communication system.

8. A method of using a personal communications device to communicate with a satellite of a satellite communications system, the method comprising:
   determining, by the personal communications device, a location of the satellite;
   determining, by the personal communications device, a location of the personal communications device;
   predicting, by the personal communications device, an improved communication path between the satellite and the personal communications device;
   determining, by the personal communications device, a recommended change in position of the personal communications device so as to position the personal communications device in the improved communication path; and
   outputting the recommended change in position to a user of the personal communications device by using an augmented reality display, wherein using the augmented reality display comprises showing a sky image and providing an indicator to suggest movement to bring an icon representing the satellite into the sky image of the augmented reality display.

9. The method of claim 8, wherein determining the location of the satellite includes looking up the location in a look-up table.

10. The method of claim 8, wherein determining the location of the personal communications device includes obtaining Global Positioning Satellite system (GPS) location information.

11. The method of claim 8, wherein predicting the improved communication path includes determining a straight-line path between the personal communications device and the satellite.

12. The method of claim 8, wherein determining the recommended change in position of the personal communications device includes determining at least one of a rotation of the personal communications device or a change in physical location of the personal communications device.

13. The method of claim 8, wherein outputting the recommended change in position includes providing audio output to indicate the recommended change.

14. A memory device containing executable instructions configured to cause a processing device of a personal communications device capable of communication with a satellite of a satellite communication system to perform operations including:
   determining a location of the satellite;
   determining a location of the personal communications device;
   predicting an improved communication path between the satellite and the personal communications device;
   determining a recommended change in position of the personal communications device so as to position the personal communications device in the improved communication path; and
   outputting the recommended change in position to a user of the personal communications device by using an augmented reality display, wherein using the augmented reality display comprises showing a sky image and providing an indicator to suggest movement to bring an icon representing the satellite into the sky image of the augmented reality display.

15. The memory device of claim 14, wherein determining the location of the satellite includes looking up the location in a look-up table.

16. The memory device of claim 14, wherein determining the location of the personal communications device includes obtaining Global Positioning Satellite system (GPS) location information.

17. The memory device of claim 14, wherein predicting the improved communication path includes determining a straight-line path between the personal communications device and the satellite.

18. The memory device of claim 14, wherein determining the recommended change in position of the personal communications device includes determining at least one of a rotation of the personal communications device or a change in physical location of the personal communications device.

19. The memory device of claim 14, wherein outputting the recommended change in position includes providing audio output to indicate the recommended change.

* * * * *